United States Patent
Moh

(10) Patent No.: US 8,731,075 B2
(45) Date of Patent: May 20, 2014

(54) BASEBAND PROCESSOR AND WIRELESS DEVICE

(75) Inventor: Kyung-Goo Moh, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 806 days.

(21) Appl. No.: 12/778,233

(22) Filed: May 12, 2010

(65) Prior Publication Data

US 2010/0303130 A1  Dec. 2, 2010

(30) Foreign Application Priority Data

May 29, 2009 (KR) .................. 10-2009-0047302

(51) Int. Cl.
*H04L 27/28* (2006.01)
*H04B 1/713* (2011.01)

(52) U.S. Cl.
USPC ............................ 375/260; 375/135; 375/136

(58) Field of Classification Search
USPC ......... 375/130, 132, 134–137, 260, 262, 265; 370/208, 210
See application file for complete search history.

(56) References Cited

U.S. PATENT DOCUMENTS

| | | | |
|---|---|---|---|
| 2004/0228267 A1* | 11/2004 | Agrawal et al. | 370/203 |
| 2005/0147024 A1* | 7/2005 | Jung et al. | 370/203 |
| 2005/0190868 A1* | 9/2005 | Khandekar et al. | 375/346 |
| 2005/0238108 A1* | 10/2005 | Suh et al. | 375/260 |
| 2006/0176859 A1* | 8/2006 | Lee et al. | 370/335 |
| 2007/0014286 A1* | 1/2007 | Lai | 370/389 |
| 2007/0058693 A1* | 3/2007 | Aytur et al. | 375/130 |
| 2007/0058739 A1* | 3/2007 | Aytur et al. | 375/260 |
| 2007/0093252 A1* | 4/2007 | Rahman et al. | 455/450 |
| 2008/0299931 A1* | 12/2008 | Yang et al. | 455/277.2 |

FOREIGN PATENT DOCUMENTS

| | | |
|---|---|---|
| KR | 1020060074800 | 7/2006 |
| KR | 10-0626671 | 9/2006 |

* cited by examiner

*Primary Examiner* — Young T. Tse
(74) *Attorney, Agent, or Firm* — Volentine & Whitt, PLLC

(57) ABSTRACT

A baseband processor includes a modulating unit and a converting unit. The modulating unit generates an orthogonal frequency division multiplexing (OFDM) symbol by modulating a bit stream. The converting unit converts the OFDM symbol from a frequency domain into a time domain, and adjusts a frequency of the OFDM symbol according to a frequency hopping sequence to perform frequency hopping in a digital domain.

6 Claims, 11 Drawing Sheets

BASEBAND PROCESSOR AND WIRELESS DEVICE

CROSS-REFERENCE TO RELATED APPLICATION(S)

A claim of priority under 35 USC §119 is made to Korean Patent Application No. 2009-0047302, filed on May 29, 2009, in the Korean Intellectual Property Office (KIPO), the contents of which are incorporated herein in its entirety by reference.

BACKGROUND

Example embodiments relate to wireless communication, and more particularly, to a baseband processor performing frequency hopping in a digital domain and to a wireless device including the baseband processor.

Ultra-wideband (UWB) communication is a radio technology that wirelessly transmits and receives signals at very low energy levels for short-range high-bandwidth communications by using a large portion of the radio spectrum. UWB communication may be generally classified as either direct sequence code division multiple access (DS-CDMA) UWB communication or multi-band orthogonal frequency division multiplexing (MB-OFDM) UWB communication. Briefly, DS-CDMA UWB communication allows multiple accesses by spreading signals with different codes. On the other hand, MB-OFDM UWB communication performs frequency hopping among frequency bands, of which each has a bandwidth of about 528 MHz, to achieve multiple access and frequency diversity. MB-OFDM UWB communication may improve diversity and may reduce multi-piconet interference by performing frequency hopping per symbol.

A conventional MB-OFDM UWB communication device requires the provision of relatively large analog radio frequency unit to execute frequency hopping.

SUMMARY

According to example embodiments, a baseband processor includes a modulating unit and a converting unit. The modulating unit generates an orthogonal frequency division multiplexing (OFDM) symbol by modulating a bit stream. The converting unit converts the OFDM symbol from a frequency domain into a time domain, and adjusts a frequency of the OFDM symbol according to a frequency hopping sequence to perform frequency hopping in a digital domain.

In some embodiments, the converting unit may include a time-frequency code unit configured to generate a band selection signal based on a time-frequency code corresponding to the frequency hopping sequence, and an inverse fast Fourier transform (IFFT) unit configured to convert the OFDM symbol from the frequency domain into the time domain, and to perform the frequency hopping in response to the band selection signal.

In some embodiments, the IFFT unit may have a point size corresponding to at least two frequency bands, may adjust the frequency of the OFDM symbol by adjusting an input position of the OFDM symbol in response to the band selection signal, and may convert the OFDM symbol having the adjusted frequency from the frequency domain into the time domain. The IFFT unit may be a 512-point IFFT unit.

In some embodiments, the IFFT unit may have a point size corresponding to one frequency band, may convert the OFDM symbol from the frequency domain into the time domain, and may adjust the frequency of the OFDM symbol by multiplying the OFDM symbol and a rotation phase corresponding to a frequency band indicated by the band selection signal. The IFFT unit may be a 128-point IFFT unit.

In some embodiments, the converting unit may include a time-frequency code unit configured to generate a band selection signal based on a time-frequency code corresponding to the frequency hopping sequence, an IFFT unit configured to convert the OFDM symbol from the frequency domain into the time domain, and a digital mixer configured to perform the frequency hopping in response to the band selection signal.

In some embodiments, the digital mixer may adjust the frequency of the OFDM symbol by multiplying the OFDM symbol and a rotation phase corresponding to a frequency band indicated by the band selection signal. The IFFT unit may be a 128-point IFFT unit.

In some embodiments, the baseband processor may further include a digital-to-analog converter configured to convert the OFDM symbol provided from the converting unit from the digital domain into an analog domain.

In some embodiments, the digital-to-analog converter may have a sampling rate corresponding to at least two frequency bands. The digital-to-analog converter may have the sampling rate of about 1,584 MHz.

According to example embodiments, a baseband processor includes a converting unit and a demodulating unit. The converting unit receives an orthogonal frequency division multiplexing (OFDM) symbol, converts the OFDM symbol from a time domain into a frequency domain, and adjusts a frequency of the OFDM symbol according to a frequency hopping sequence to perform frequency de-hopping in a digital domain. The demodulating unit generates a bit stream by demodulating the OFDM symbol provided from the converting unit.

In some embodiments, the converting unit may include a time-frequency code unit configured to generate a band selection signal based on a time-frequency code corresponding to the frequency hopping sequence, and a fast Fourier transform (FFT) unit configured to convert the OFDM symbol from the time domain into the frequency domain, and to perform the frequency de-hopping in response to the band selection signal.

In some embodiments, the FFT unit may have a point size corresponding to at least two frequency bands, may convert the OFDM symbol from the time domain into the frequency domain, and may adjust the frequency of the OFDM symbol by adjusting an output position of the OFDM symbol in response to the band selection signal.

In some embodiments, the FFT unit may have a point size corresponding to one frequency band, may adjust the frequency of the OFDM symbol by multiplying the OFDM symbol and a rotation phase corresponding to a frequency band indicated by the band selection signal, and may convert the OFDM symbol having the adjusted frequency from the time domain into the frequency domain.

In some embodiments, the converting unit may include a time-frequency code unit configured to generate a band selection signal based on a time-frequency code corresponding to the frequency hopping sequence, a digital mixer configured to perform the frequency de-hopping in response to the band selection signal, and a fast Fourier transform unit configured to convert the OFDM symbol from the time domain into the frequency domain.

In some embodiments, the digital mixer may adjust the frequency of the OFDM symbol by multiplying the OFDM symbol and a rotation phase corresponding to a frequency band indicated by the band selection signal.

In some embodiments, the baseband processor may further include an analog-to-digital converter configured to provide the OFDM symbol the converting unit by converting the OFDM symbol from an analog domain into the digital domain.

In some embodiments, the analog-to-digital converter may have a sampling rate corresponding to at least two frequency bands.

According to example embodiments, a wireless device includes an antenna, a radio frequency (RF) unit and a baseband processor. The antenna transmits a transmission orthogonal frequency division multiplexing (OFDM) symbol, and receives a reception OFDM symbol. The RF unit provides the transmission OFDM symbol to the antenna by up-converting a frequency of the transmission OFDM symbol, and down-converts a frequency of the reception OFDM symbol provided from the antenna. The baseband processor performs frequency hopping of the transmission OFDM symbol in a digital domain by adjusting the frequency of the transmission OFDM symbol according to a frequency hopping sequence, and performs frequency de-hopping of the reception OFDM symbol in the digital domain by adjusting the frequency of the reception OFDM symbol according to the frequency hopping sequence.

In some embodiments, the RF unit may include a single local oscillator having a fixed oscillation frequency regardless of the frequency hopping sequence.

In some embodiments, the wireless device may simultaneously communicate with a plurality of wireless devices.

In some embodiments, the wireless device may communicate with the plurality of wireless devices using a plurality of frequency hopping sequences, respectively, and wherein the plurality of frequency hopping sequences are different from each other.

In some embodiments, the wireless device may communicate with the plurality of wireless devices using a plurality of subcarriers that are assigned to communications with the plurality of wireless devices such that the assignments of the plurality of subcarriers do not overlap.

In some embodiments, the wireless device may communicate with the plurality of wireless devices using a plurality of orthogonal codes respectively, and the orthogonal codes may be orthogonal to each other.

BRIEF DESCRIPTION OF THE DRAWINGS

Illustrative, non-limiting example embodiments will become readily understood from the detailed description that follows taken in conjunction with the accompanying drawings.

DETAILED DESCRIPTION OF THE EMBODIMENTS

Figure 1:
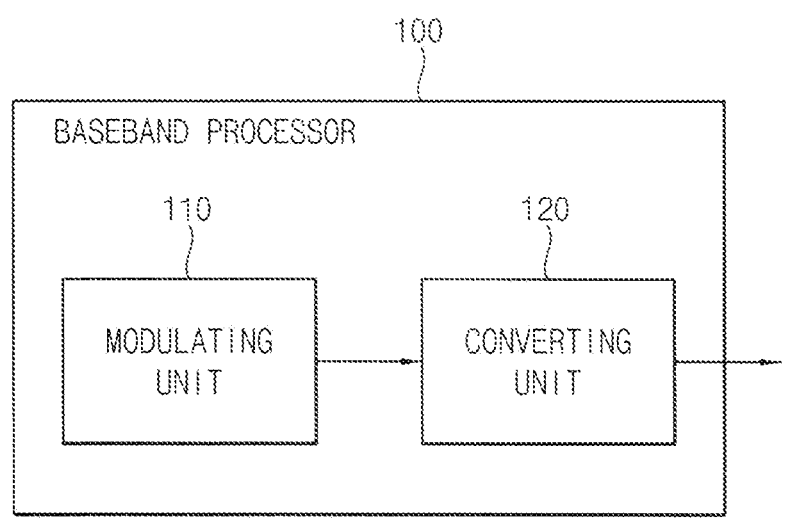
FIG. 1 is a block diagram illustrating a baseband processor according to example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a baseband processor according to example embodiments.

Referring to FIG. 1, a baseband processor 100 includes a modulating unit 110 and a converting unit 120.

The modulating unit 110 generates an orthogonal frequency division multiplexing (OFDM) symbol by modulating a bit stream to be transmitted. The source of the bit stream can vary among the example embodiments. For example, in some embodiments, the modulating unit 110 receives the bit stream from an upper layer unit, such as a media access controller (MAC), included in the baseband processor 100. In other embodiments, the modulating unit 110 receives the bit stream from an external device. The modulating unit 110 modulates the bit stream by performing one or more signal processes. Examples of the signal processes include scrambling, encoding, interleaving, constellation mapping, and so on.

The converting unit 120 converts the OFDM symbol provided from the modulating unit 110 from a frequency domain into a time domain, and adjusts a frequency of the OFDM symbol according to a frequency hopping sequence while maintaining a bandwidth of the OFDM symbol. Accordingly, the OFDM symbol may be frequency-hopped in a digital domain by the baseband processor 100.

The OFDM symbol output from the converting unit 120 may be converted into an analog domain signal, and the analog domain OFDM symbol may then be provided to a radio frequency (RF) unit. The RF unit may be used to up-convert the frequency of the OFDM symbol using an oscillation signal of a fixed frequency regardless of the frequency hopping sequence since the frequency of the OFDM symbol is adjusted according to the frequency hopping sequence in advance, i.e., before the RF unit receives the OFDM symbol. Accordingly, implementation of the RF unit may be facilitated.

A conventional multi-band orthogonal frequency division multiplexing (MB-OFDM) ultra-wideband (UWB) communication device includes a plurality of local oscillators in an RF unit, or includes a single side band (SSB) mixer having a relative complex configuration to perform the frequency hopping. Thus, in the conventional MB-OFDM UWB communication device, the RF unit is physically large, has high power consumption, and signals are not uniform among frequency bands. In contrast, in a wireless device including the baseband processor 100 according to some example embodiments, a relatively non-complex RF unit may be implemented in a relatively small size since the baseband processor 100 performs the frequency hopping in the digital domain.

Figure 2:
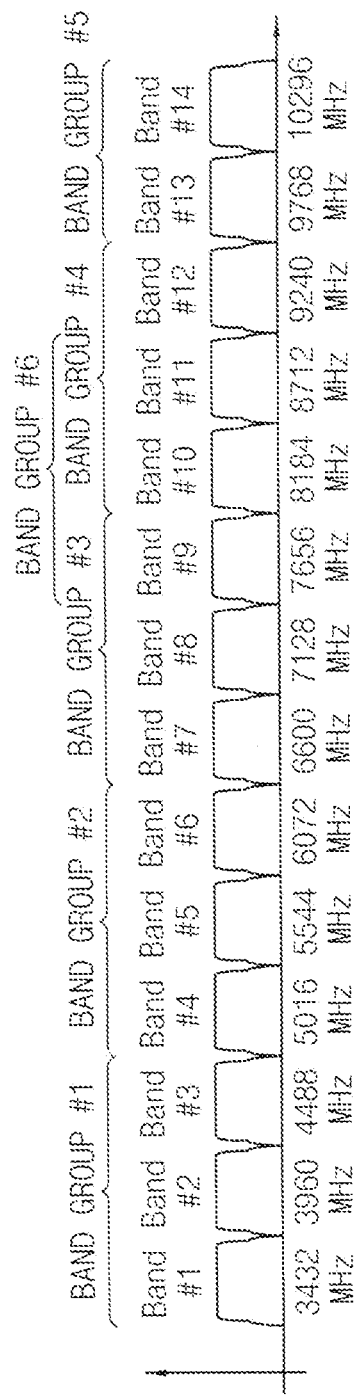
FIG. 2 is a diagram illustrating frequency bands used in a multi-band orthogonal frequency division multiplexing (MB-OFDM) ultra wideband (UWB) communication.

FIG. 2 is a diagram illustrating frequency bands used in a MB-OFDM UWB communication.

Referring to FIG. 2, a first band group includes a first frequency band having a center frequency of about 3,432 MHz, a second frequency band having a center frequency of about 3,960 MHz, and a third frequency band having a center frequency of about 4,488 MHz. A second band group includes a fourth frequency band having a center frequency of about 5,016 MHz, a fifth frequency band having a center frequency of about 5,544 MHz, and a sixth frequency band having a center frequency of about 6,072 MHz. A third band group includes a seventh frequency band having a center frequency of about 6,600 MHz, an eighth frequency band having a center frequency of about 7,128 MHz, and a ninth frequency band having a center frequency of about 7,656 MHz. A fourth band group includes a tenth frequency band having a center frequency of about 8,184 MHz, an eleventh frequency band having a center frequency of about 8,712 MHz, and a twelfth frequency band having a center frequency of about 9,240 MHz. A fifth band group includes a thirteenth frequency band having a center frequency of about 9,768 MHz, and a fourteenth frequency band having a center frequency of about 10,296 MHz. A sixth band group includes the ninth frequency band, the tenth frequency, and the eleventh frequency band. Each of the first through the fourteenth frequency bands may have a bandwidth of about 528 MHz.

Referring again to FIG. 1, the baseband processor 100 may perform the frequency hopping among a plurality of frequency bands in one band group. For example, the baseband processor 100 may perform the frequency hopping among the first frequency band, the second frequency band and the third frequency band included in the first band group. When a wireless device including the baseband processor 100 communicates in the first band group, the converting unit 120 may generate an OFDM symbol corresponding to one of the first frequency band, the second frequency band and the third frequency band according to the frequency hopping sequence, and the RF unit may generate a first band signal, a second band signal or a third band signal by up-converting a frequency of the OFDM symbol regardless of the frequency hopping sequence.

For example, the converting unit 120 may selectively generate a second OFDM symbol corresponding to the second frequency band, a first OFDM symbol having a center frequency lower by about 528 MHz than that of the second OFDM symbol, or a third OFDM symbol having a center frequency higher by about 528 MHz than that of the second OFDM symbol according to the frequency hopping sequence. The RF unit may generate the first band signal having a center frequency of about 3,432 MHz, the second band signal having a center frequency of about 3,960 MHz, or the third band signal having a center frequency of about 4,488 MHz by up-converting the frequency of the first OFDM symbol, the second OFDM symbol, or the third OFDM symbol by about 3,960 MHz regardless of the frequency hopping sequence. Thus, the wireless device including the baseband processor 100 according to some example embodiments may include the RF unit having a relatively simple configuration.

Figure 3:
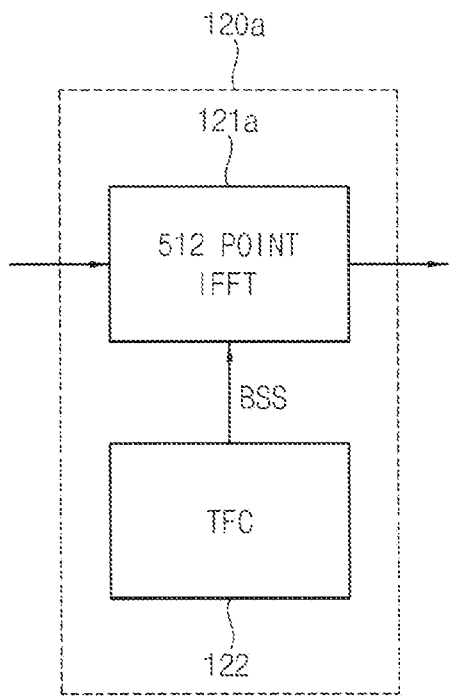
FIG. 3 is a block diagram illustrating an example of a converting unit included in a baseband processor of FIG. 1 according to example embodiments.

FIG. 3 is a block diagram illustrating an example of a converting unit included in a baseband processor of FIG. 1.

Referring to FIG. 3, a converting unit 120a includes an inverse fast Fourier transform (IFFT) unit 121a and a time frequency code (TFC) unit 122.

The TFC unit 122 generates a band selection signal BSS based on a time frequency code corresponding to a frequency hopping sequence. For example, if a wireless device is to perform frequency hopping according to the frequency hopping sequence of a first frequency band, a second frequency band, a third frequency band, the first frequency band, the second frequency band, and the third frequency band, the TFC unit 122 may store the time frequency code "123123". In some embodiments, when the wireless device participates in a piconet, the TFC unit 122 may detect a frequency hopping sequence used in the piconet, and may store a time frequency code corresponding to the detected frequency hopping sequence. In other embodiments, when the wireless device communicates with a plurality of wireless devices, the TFC unit 122 may store a plurality of time frequency codes corresponding to a plurality of frequency hopping sequences for communicating with the plurality of wireless devices, respectively.

The band selection signal BSS may indicate one frequency band in which an OFDM symbol is to be transmitted at a certain time point. For example, if the time frequency code is "123123", the TFC unit 122 may generate the band selection signal BSS indicating one of the first frequency band, the second frequency band, and the third frequency band, and may provide the band selection signal BSS to the IFFT unit 121a.

The IFFT unit 121a may have a size corresponding to at least two frequency bands. That is, the point size of the IFFT unit 121a may correspond to the sum of bandwidths of at least two frequency bands. In a MB-OFDM UWB communication, one frequency band has a bandwidth of about 528 MHz, and signals transmitted/received in one frequency band includes 128 sub carriers (i.e., 128 tones). For example, the IFFT unit 121a may be a 256-point IFFT unit that has a point size corresponding to two frequency bands, or a 512-point IFFT unit that has a point size corresponding to four frequency bands. If the wireless device performs the frequency hopping among three frequency bands, the IFFT unit 121a may be the 512-point IFFT unit.

The IFFT unit 121a performs the frequency hopping in response to the band selection signal BSS. The IFFT unit 121a may adjust a frequency of a frequency domain OFDM symbol provided from the modulating unit 110 of FIG. 1 in response to the band selection signal BSS. Since the IFFT unit 121a has the point size corresponding to at least two frequency bands, the IFFT unit 121a may readily adjust the frequency by adjusting an input position of the frequency domain OFDM symbol from the modulating unit 110 of FIG. 1 to the IFFT unit 121a.

For example, when the wireless device communicates in the first band group of FIG. 2, a second OFDM symbol to be transmitted in the second frequency band may be input to the IFFT unit 121a as it is, a first OFDM symbol to be transmitted in the first frequency band may be moved in a direction where the frequency decreases by 128 tones, and a third OFDM symbol to be transmitted in the third frequency band may be moved in a direction where the frequency increases by 128 tones. The IFFT unit 121a performs IFFT operation on such an OFDM symbol. By the IFFT operation, the second OFDM symbol may be converted into a time domain OFDM symbol having a center frequency of about 0 MHz, the first OFDM symbol may be converted into a time domain OFDM symbol having a center frequency of about −528 MHz, and the third OFDM symbol may be converted into a time domain OFDM symbol having a center frequency of about 528 MHz. The time domain OFDM symbol may be input to an RF unit, and the RF unit may transmit the OFDM symbol in a corresponding frequency band by up-converting the frequency of the time domain OFDM symbol using a fixed oscillation frequency, for example, of about 3,960 MHz. In other examples, the first OFDM symbol may be input to the IFFT unit 121a as it is, the second OFDM symbol may be moved in a direction where the frequency increases by 128 tones, and the third OFDM symbol may be moved in a direction where the frequency increases by 256 tones.

As described above, the converting unit 120a according to some example embodiments may perform the frequency hopping in a digital domain without complicated operations by adjusting the input position of the frequency domain OFDM symbol in response to the band selection signal BSS.

Figure 4:
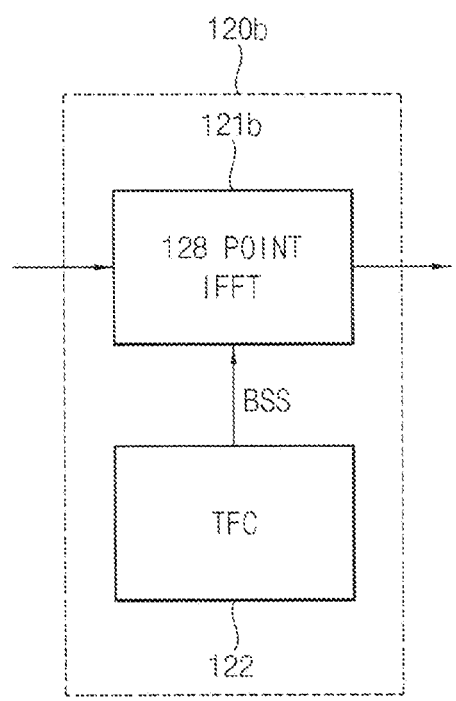
FIG. 4 is a block diagram illustrating another example of a converting unit included in a baseband processor of FIG. 1 according to example embodiments.

FIG. 4 is a block diagram illustrating another example of a converting unit included in a baseband processor of FIG. 1.

Referring to FIG. 4, a converting unit 120b includes an IFFT unit 121b and a TFC unit 122.

The TFC unit 122 may store a time frequency code corresponding to a frequency hopping sequence, and may generate a band selection signal BSS based on the stored time frequency code. For example, if the time frequency code stored in the TFC unit 122 is "123123", the TFC unit 122 may generate the band selection signal BSS indicating one of a first frequency band, a second frequency band, and a third frequency band, and may provide the band selection signal BSS to the IFFT unit 121b.

The IFFT unit 121b may have a point size corresponding to one frequency band. For example, the IFFT unit 121b may be a 128-point IFFT unit.

The IFFT unit 121b performs frequency hopping by adjusting a frequency of an OFDM symbol in response to the band selection signal BSS, and performs an IFFT operation to convert the OFDM symbol from a frequency domain to a time domain. In some embodiments, the IFFT unit 121b may simultaneously perform the frequency hopping and the IFFT operation. In other embodiments, the IFFT unit 121b may perform the frequency hopping after the IFFT operation.

The IFFT unit 121b may adjust the frequency of the OFDM symbol by multiplying the OFDM symbol and a rotation phase (e.g., $\exp(j2\pi ft)$, where f represents an increment of the frequency) corresponding to a frequency band indicated by the band selection signal BSS. For example, when a wireless device communicates in a first band group of FIG. 2, an OFDM symbol to be transmitted in the second frequency band may not be multiplied by the rotation phase, an OFDM symbol to be transmitted in the first frequency band may be multiplied by a rotation phase that decreases the frequency by about 528 MHz, and an OFDM symbol to be transmitted in the third frequency band may be multiplied by a rotation phase that increases the frequency by about 528 MHz. Accordingly, an RF unit may up-convert the OFDM symbol using a fixed oscillation frequency, for example, of about 3,960 MHz to transmit the OFDM symbol in a corresponding frequency band.

As described above, the converting unit 120b according to some example embodiments may perform the frequency hopping in a digital domain by multiplying the OFDM symbol and the rotation phase in response to the band selection signal BSS.

Figure 5:
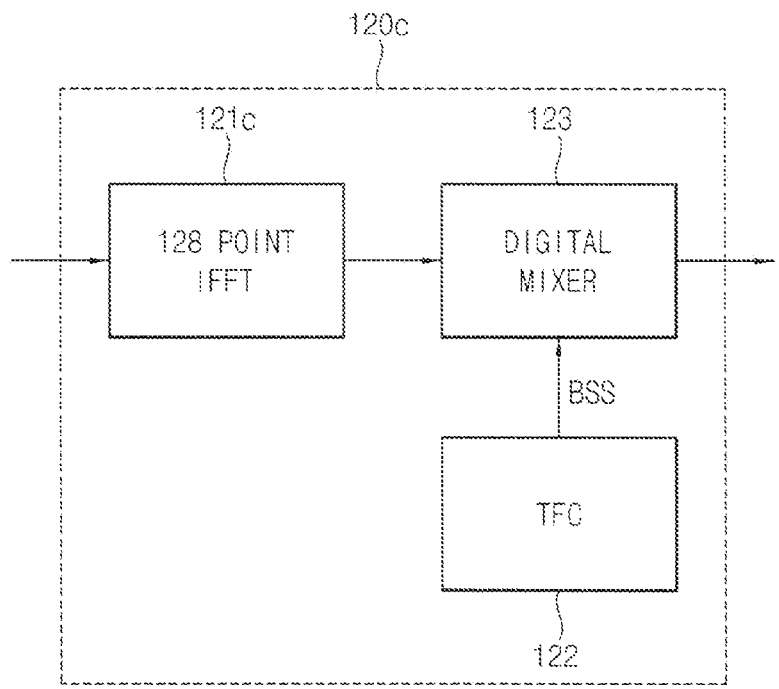
FIG. 5 is a block diagram illustrating still another example of a converting unit included in a baseband processor of FIG. 1 according to example embodiments.

FIG. 5 is a block diagram illustrating still another example of a converting unit included in a baseband processor of FIG. 1.

Referring to FIG. 5, a converting unit 120c includes an IFFT unit 121c, a TFC unit 122, and a digital mixer 123.

The IFFT unit 121c may have a point size corresponding to one frequency band. For example, the IFFT unit 121c may be a 128-point IFFT unit. The IFFT unit 121c performs an IFFT operation to convert an OFDM symbol from a frequency domain to a time domain.

The TFC unit 122 may store a time frequency code corresponding to a frequency hopping sequence, and may generate a band selection signal BSS based on the stored time frequency code. The band selection signal BSS may indicate a frequency band in which the OFDM symbol is to be transmitted. The TFC unit 122 may provide the band selection signal BSS to the digital mixer 123.

The digital mixer 123 performs frequency hopping by adjusting a frequency of the OFDM symbol in the time domain in response to the band selection signal BSS. The digital mixer 123 may adjust the frequency of the OFDM symbol by multiplying the OFDM symbol and a rotation phase (e.g., $\exp(j2\pi ft)$, where f represents an increment of the frequency) corresponding to the frequency band indicated by the band selection signal BSS. For example, if the OFDM symbol to be transmitted in the second frequency band, the digital mixer 123 may not multiply the OFDM symbol and the rotation phase. If the OFDM symbol to be transmitted in the first frequency band, the digital mixer 123 may multiply the OFDM symbol and the rotation phase that decreases the frequency by about 528 MHz. If the OFDM symbol to be transmitted in the third frequency band, the digital mixer 123 may multiply the OFDM symbol and the rotation phase that increases the frequency by about 528 MHz. Accordingly, an RF unit may up-convert the OFDM symbol using a fixed oscillation frequency, for example, of about 3,960 MHz to transmit the OFDM symbol in a corresponding frequency band.

As described above, the converting unit 120c according to some example embodiments may perform the frequency hopping in a digital domain by multiplying the OFDM symbol and the rotation phase in response to the band selection signal BSS.

Figure 6:
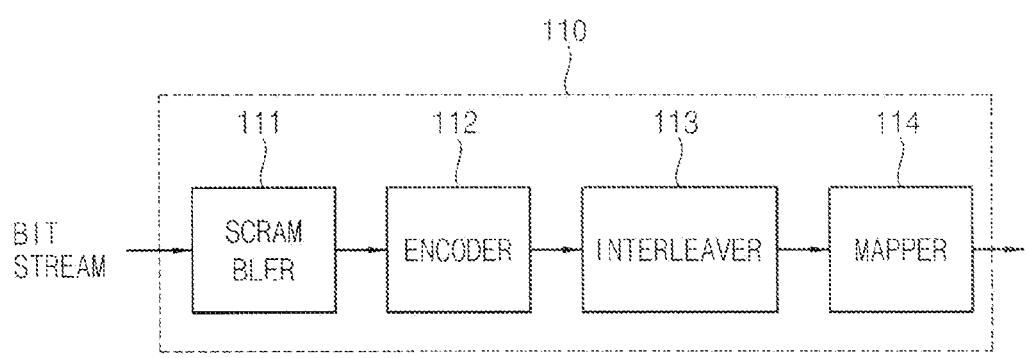
FIG. 6 is a block diagram illustrating an example of a modulating unit included in a baseband processor of FIG. 1 according to example embodiments.

FIG. 6 is a block diagram illustrating an example of a modulating unit included in a baseband processor of FIG. 1.

Referring to FIG. 6, a modulating unit 110 includes a scrambler 111, an encoder 112, an interleaver 113 and a mapper 114.

The scrambler 111 receives a bit stream to be transmitted. In some embodiments, the scrambler 111 may receive the bit stream from an upper layer unit, such as a MAC, included in the baseband processor 100 of FIG. 1. In other embodiments, the scrambler 111 may receive the bit stream from an external device. The scrambler 111 scrambles the bit stream, and provides scrambled data to the encoder 112. In some embodiments, the scrambler 111 may include a linear feedback shift register (LFSR) for generating a pseudo random binary sequence (PRBS).

The encoder 112 encodes the scrambled data provided from the scrambler 111. For example, the encoder 112 may encode the scrambled data using a Reed-Solomon code, a punctured convolution code, a convolutional code, a low density parity check (LDPC) code, a turbo code, or the like.

The interleaver 113 interleaves the encoded data provided from the encoder 112. Consecutive bits of the encoded data may be interleaved by the interleaver 113, and thus errors on a wireless channel may be readily recovered. For example, the interleaver 113 may perform symbol interleaving, tone interleaving, cyclic shifting, or the like.

The mapper 114 generates an OFDM symbol by modulating the interleaved data provided from the interleaver 113. The mapper 114 may modulate the interleaved data using an appropriate constellation according to a modulation scheme. For example, the mapper 114 may perform mapping in the modulation scheme, such as quadrature phase shift keying (QPSK), 256 quadrature amplitude modulation (QAM), 64QAM, 16QAM, dual carrier modulation (DCM), etc. In some embodiments, the mapper 114 may insert a pilot into a mapped symbol, and may add a cyclic prefix (CP) and a guard interval (GI) to the mapped symbol. The GI may be inserted between adjacent symbols to prevent inter-symbol interference, and the added CP may improve orthogonal property of symbols. In some embodiments, an IFFT unit may insert the pilot, and may add the CP and the GI.

The modulating unit 110 is illustrated in FIG. 6 as including the scrambler 111, the encoder 112, the interleaver 113 and the mapper 114. However, the modulating unit 110 may have various other configurations according to communication standards. For example, the modulating unit 110 may further include a time/frequency spreading unit for duplicating data to obtain diversity gain.

Figure 7:
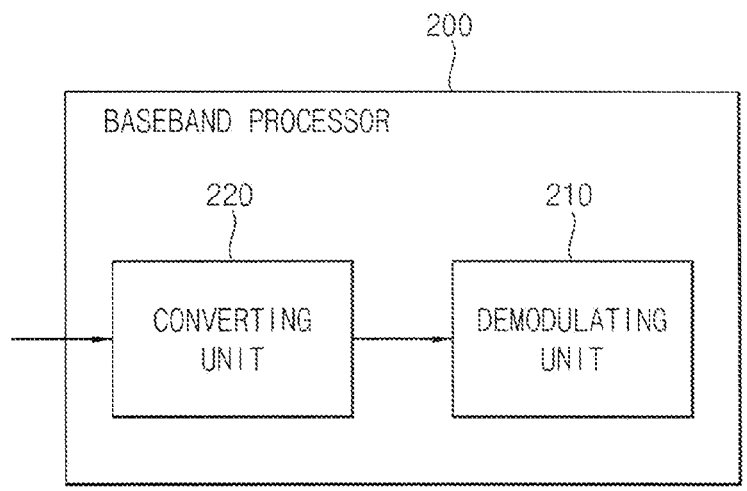
FIG. 7 is a block diagram illustrating a baseband processor according to example embodiments.

FIG. 7 is a block diagram illustrating a baseband processor according to example embodiments.

Referring to FIG. 7, a baseband processor 200 includes a demodulating unit 210 and a converting unit 220.

The converting unit 220 receives an OFDM symbol in a time domain from an RF unit, converts the OFDM symbol from the time domain into a frequency domain, and adjust a frequency of the OFDM symbol according to a frequency hopping sequence such that the OFDM symbol has a fixed center frequency regardless of a frequency band in which the OFDM symbol is transmitted. Accordingly, the OFDM symbol may be de-hopped in a digital domain by the baseband processor 200. Since the converting unit 200 performs the frequency de-hopping, the RF unit may down-convert the frequency of the OFDM symbol using an oscillation signal of a fixed frequency regardless of the frequency hopping sequence. Accordingly, the RF unit may be easily implemented. The converting unit 220 may provide the OFDM symbol in the frequency domain to the demodulating unit 210.

The demodulating unit 210 may generate a bit stream by demodulating the OFDM symbol provided from the converting unit 220. In some embodiments, the demodulating unit 210 may provide the bit stream to an upper layer unit, such as a MAC, included in the baseband processor 200. In other embodiments, the demodulating unit 210 may provide the bit stream to an external device. The demodulating unit 210 may demodulate the OFDM symbol by performing signal processes, such as constellation demapping, deinterleaving, decoding, descrambling, and so on.

A conventional MB-OFDM UWB communication device includes a plurality of local oscillators in an RF unit, or includes a single side band (SSB) mixer having a complex configuration to perform the frequency de-hopping. Thus, in the conventional MB-OFDM UWB communication device, the RF unit is relatively large, consume relatively high power, and signals are not uniform for frequency bands. In contrast, in a wireless device including the baseband processor 200 according to some example embodiments, implementation of an RF unit of relatively small size is facilitated since the baseband processor 200 performs the frequency de-hopping in the digital domain.

Figure 8:
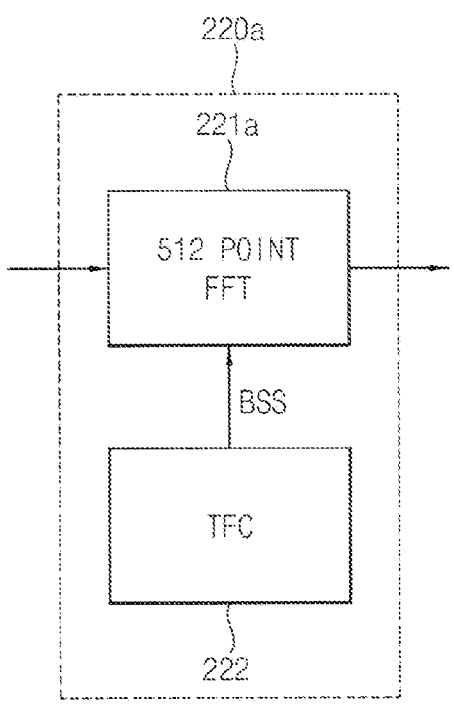
FIG. 8 is a block diagram illustrating an example of a converting unit included in a baseband processor of FIG. 7 according to example embodiments.

FIG. 8 is a block diagram illustrating an example of a converting unit included in a baseband processor of FIG. 7.

Referring to FIG. 8, a converting unit 220a includes a fast Fourier transform (FFT) unit 221a and a time frequency code (TFC) unit 222.

The TFC unit 222 generates a band selection signal BSS based on a time frequency code corresponding to a frequency hopping sequence. For example, if a wireless device is to perform frequency de-hopping according to the frequency hopping sequence of a first frequency band, a second frequency band, a third frequency band, the first frequency band, the second frequency band, and the third frequency band, the TFC unit 222 may store the time frequency code "123123". The band selection signal BSS may indicate one frequency band in which an OFDM symbol is received. For example, if the time frequency code is "123123", the TFC unit 222 may generate the band selection signal BSS indicating one of the first frequency band, the second frequency band, and the third frequency band, and may provide the band selection signal BSS to the FFT unit 221a.

The FFT unit 221a may have a point size corresponding to at least two frequency bands. For example, the FFT unit 221a may be a 512-point FFT unit. The FFT unit 221a receives a time domain OFDM symbol from an RF unit. Since the RF unit does not perform the frequency de-hopping, the FFT unit 221a may receive the time domain OFDM symbol corresponding to any one of at least two frequency bands. Since the FFT unit 221a has a point size corresponding to at least two frequency bands, the FFT unit 221a may convert the time domain OFDM symbol into a frequency domain without an additional mapping operation.

For example, when the wireless device communicates in a first band group of FIG. 2, the RF unit may down-convert the frequency of one of a first OFDM symbol corresponding to a first frequency band, a second OFDM symbol corresponding to a second frequency band, and a third OFDM symbol corresponding to a third frequency band using a fixed oscillation frequency, for example, of about 3,960 MHz, and the FFT unit 221a may receive one of the first OFDM symbol having a center frequency of about −528 MHz, the second OFDM symbol having a center frequency of about 0 MHz, and the third OFDM symbol having a center frequency of about 528 MHz from the RF unit. The FFT unit 221a may convert the one of the first OFDM symbol, the second OFDM symbol and the third OFDM symbol from the time domain into the frequency domain.

The FFT unit 221a may perform frequency de-hopping by adjusting the frequency of frequency domain OFDM symbol in response to the band selection signal BSS. The FFT unit 221a may readily adjust the frequency by adjusting an output position of the frequency domain OFDM symbol from the FFT unit 221a to the demodulating unit 210 of FIG. 7. For example, when the wireless device communicates in the first band group of FIG. 2, the FFT unit 221a may output the second OFDM symbol as it is, may move the first OFDM symbol in a direction where the frequency increases by 128 tones to output the moved first OFDM symbol, and may move the third OFDM symbol in a direction where the frequency decreases by 128 tones to output the moved third OFDM symbol. Accordingly, the demodulating unit 210 of FIG. 7 may receive a frequency domain OFDM symbol having a fixed center frequency regardless of the frequency hopping sequence.

As described above, the converting unit 220a according to some example embodiments may perform the frequency de-hopping in a digital domain without complicated operations by adjusting the output position of the frequency domain OFDM symbol in response to the band selection signal BSS.

Figure 9:
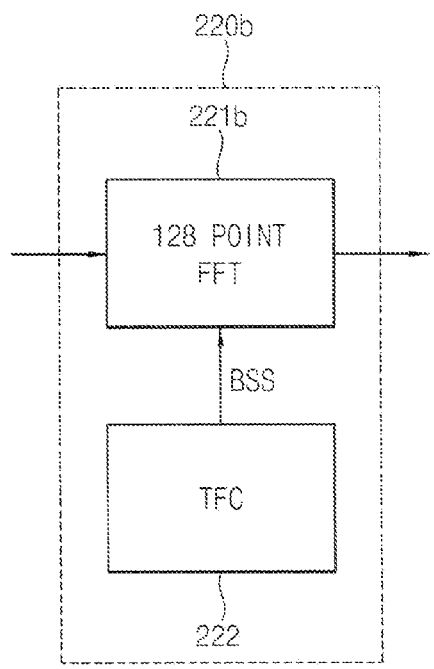
FIG. 9 is a block diagram illustrating another example of a converting unit included in a baseband processor of FIG. 7 according to example embodiments.

FIG. 9 is a block diagram illustrating another example of a converting unit included in a baseband processor of FIG. 7.

Referring to FIG. 9, a converting unit 220b includes an FFT unit 221b and a TFC unit 222.

The TFC unit 222 may store a time frequency code corresponding to a frequency hopping sequence, and may generate a band selection signal BSS based on the stored time frequency code. For example, if the time frequency code stored in the TFC unit 222 is "123123", the TFC unit 222 may generate the band selection signal BSS indicating one of a first frequency band, a second frequency band, and a third frequency band, and may provide the band selection signal BSS to the FFT unit 221b.

The FFT unit 221b may have a point size corresponding to one frequency band. For example, the FFT unit 221b may be a 128-point IFFT unit.

The FFT unit 221b performs frequency de-hopping by adjusting a frequency of an OFDM symbol in response to the band selection signal BSS, and performs an FFT operation to convert the OFDM symbol from a time domain to a frequency domain. In some embodiments, the FFT unit 221b may simultaneously perform the frequency de-hopping and the IFFT operation. In other embodiments, the FFT unit 221b may perform the FFT operation after the frequency de-hopping.

The FFT unit 221b may adjust the frequency of the OFDM symbol by multiplying the OFDM symbol and a rotation phase (e.g., $\exp(j2\pi ft)$, where f represents an increment of the frequency) corresponding to a frequency band indicated by the band selection signal BSS. For example, when a wireless device communicates in a first band group of FIG. 2, an OFDM symbol received in the second frequency band may not be multiplied by the rotation phase, an OFDM symbol received in the first frequency band may be multiplied by a rotation phase that increases the frequency by about 528 MHz, and an OFDM symbol received in the third frequency band may be multiplied by a rotation phase that decreases the frequency by about 528 MHz. Thus, the FFT unit 221b may perform the FFT operation on a time domain OFDM symbol having a fixed center frequency regardless of the frequency hopping sequence.

As described above, the converting unit 220b according to some example embodiments may perform the frequency de-hopping in a digital domain by multiplying the OFDM symbol and the rotation phase in response to the band selection signal BSS.

Figure 10:
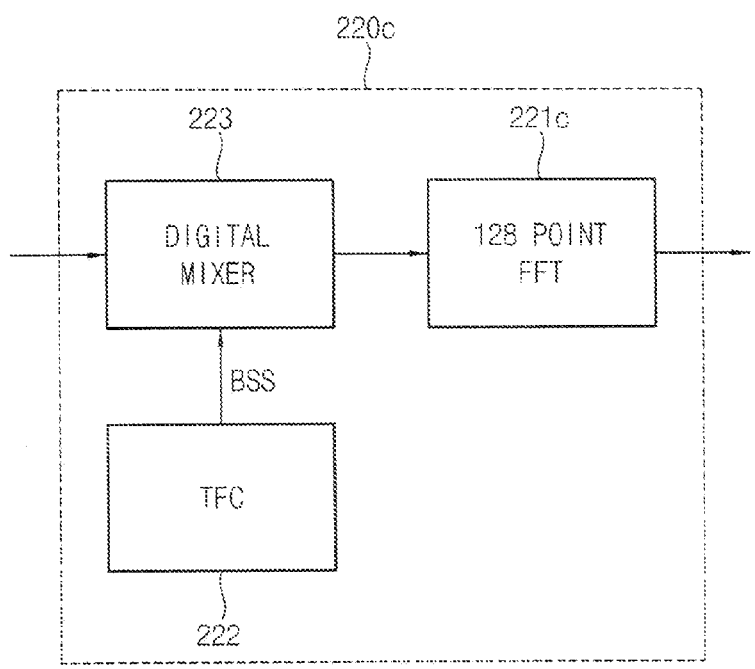
FIG. 10 is a block diagram illustrating still another example of a converting unit included in a baseband processor of FIG. 7 according to example embodiments.

FIG. 10 is a block diagram illustrating still another example of a converting unit included in a baseband processor of FIG. 7.

Referring to FIG. 10, a converting unit 220c includes an FFT unit 221c, a TFC unit 222, and a digital mixer 223.

The TFC unit 222 may store a time frequency code corresponding to a frequency hopping sequence, and may generate a band selection signal BSS based on the stored time frequency code. The band selection signal BSS may indicate a frequency band in which an OFDM symbol is received. The TFC unit 222 may provide the band selection signal BSS to the digital mixer 223.

The digital mixer 223 performs frequency de-hopping by adjusting a frequency of the OFDM symbol in response to the band selection signal BSS. The digital mixer 223 may adjust the frequency of the OFDM symbol by multiplying the OFDM symbol and a rotation phase (e.g., $\exp(j2\pi ft)$, where f represents an increment of the frequency) corresponding to the frequency band indicated by the band selection signal BSS. For example, if the OFDM symbol is received in a second frequency band, the digital mixer 223 may not multiply the OFDM symbol and the rotation phase. If the OFDM symbol is received in the first frequency band, the digital mixer 223 may multiply the OFDM symbol and the rotation phase that decreases the frequency by about 528 MHz. Accordingly, the digital mixer 223 may provide a time domain OFDM symbol having a fixed center frequency regardless of the frequency hopping sequence to the FFT unit 221c.

The FFT unit 221c may have a point size corresponding to one frequency band. For example, the FFT unit 221c may be a 128-point FFT unit. The FFT unit 221c performs an FFT operation to convert the OFDM symbol from a time domain to a frequency domain.

As described above, the converting unit 220c according to some example embodiments may perform the frequency de-hopping in a digital domain by multiplying the OFDM symbol and the rotation phase in response to the band selection signal BSS.

Figure 11:
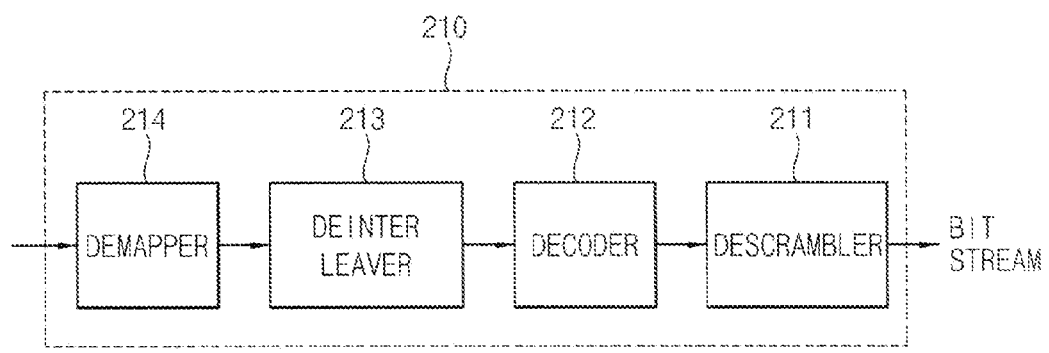
FIG. 11 is a block diagram illustrating an example of a demodulating unit included in a baseband processor of FIG. 7 according to example embodiments.

FIG. 11 is a block diagram illustrating an example of a demodulating unit included in a baseband processor of FIG. 7.

Referring to FIG. 11, a demodulating unit 210 includes a descrambler 211, a decoder 212, a deinterleaver 213 and a demapper 214.

The demapper 214 demodulates an OFDM symbol that is modulated by the mapper 114 of FIG. 6. The demapper 214 may remove CP from the OFDM symbol. The deinterleaver 213 recovers data that are interleaved by the interleaver 113 of FIG. 6. The decoder 212 decodes data that are encoded by the encoder 112 of FIG. 6. The descrambler 211 generates a bit stream by descrambling data that are scrambled by the scrambler 111 of FIG. 6. In some embodiments, the descrambler 211 may provide the bit stream to an upper layer unit, such as a MAC.

The demodulating unit 210 is illustrated in FIG. 11 as including the descrambler 211, the decoder 212, the deinterleaver 213 and the demapper 214. However, the demodulating unit 210 may have various other configurations according to communication standards.

Figure 12:
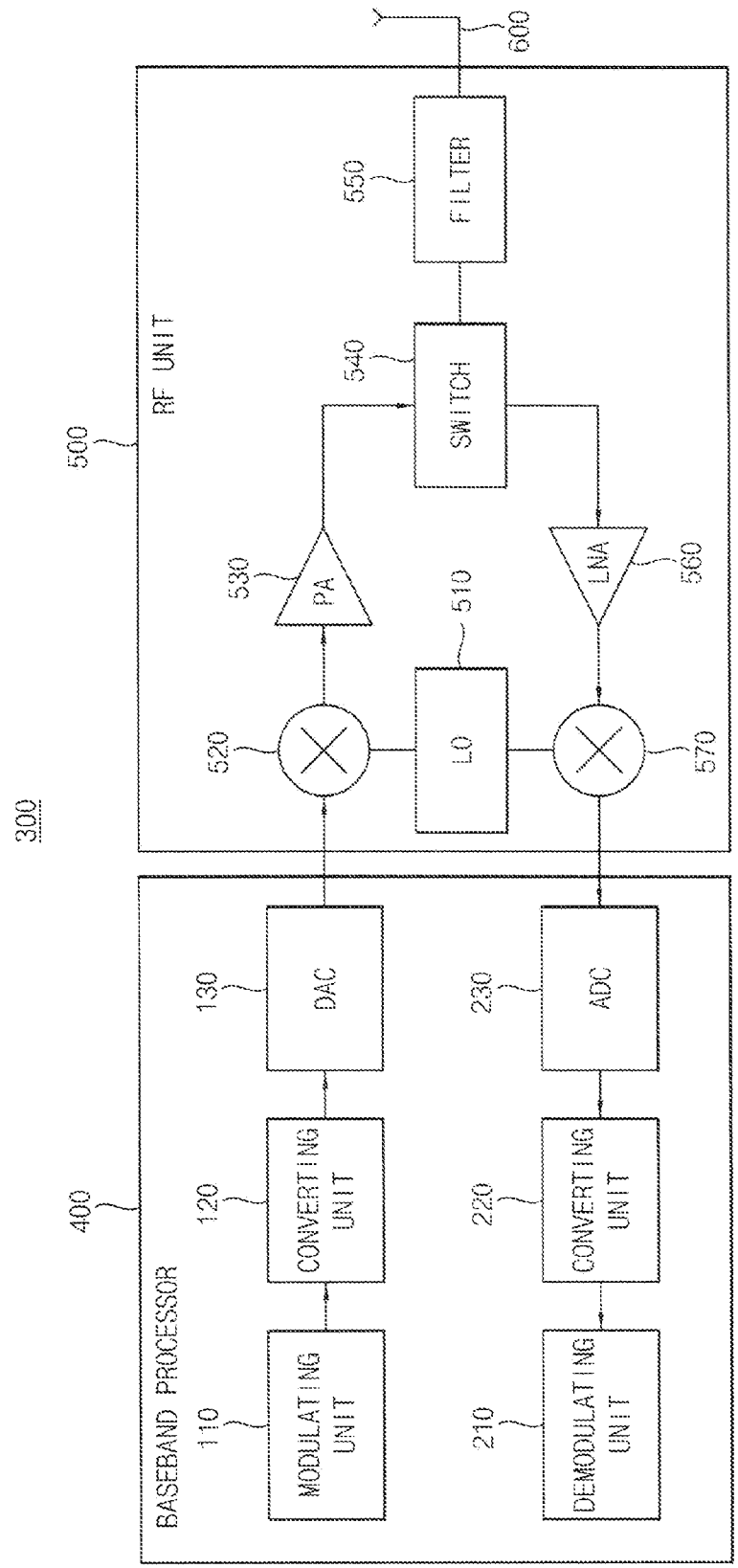
FIG. 12 is a block diagram illustrating a wireless device according to example embodiments.

FIG. 12 is a block diagram illustrating a wireless device according to example embodiments.

Referring to FIG. 12, a wireless device 300 includes a baseband processor 400, a RF unit 500 and an antenna 600.

The baseband processor 400 provides the RF unit 500 with a transmission OFDM symbol corresponding to a transmission bit stream, and generates a reception bit stream based on a reception OFDM symbol provided from the RF unit 500. The baseband processor 400 includes a modulating unit 110, a first converting unit 120, a digital-to-analog converter 130, an analog-to-digital converter 230, a second converting unit 220 and a demodulating unit 210.

The modulating unit 110 generates the transmission OFDM symbol by modulating the transmission bit stream. The first converting unit 120 converts the transmission OFDM symbol from a frequency domain into a time domain, and adjusts a frequency of the transmission OFDM symbol according to a frequency hopping sequence to perform frequency hopping in a digital domain. The digital-to-analog converter 130 converts the transmission OFDM symbol having an adjusted center frequency from the digital domain into an analog domain. The digital-to-analog converter 130 provides the RF unit 500 with the transmission OFDM symbol that is converted into the analog domain.

In some embodiments, the first converting unit 120 may increase power of a portion or whole OFDM symbol according to a frequency band in which the OFDM symbol is transmitted. For example, an IFFT unit of the first converting unit 120 may increase the power per frequency band or per tone. Accordingly, the wireless device 300 may transmit signals that are uniform for a plurality of frequency bands.

The analog-to-digital converter 230 receives the reception OFDM symbol from the RF unit 500, and converts the reception OFDM symbol from the analog domain into the digital domain. The second converting unit 220 converts the reception OFDM symbol from the time domain into the frequency domain, and adjusts a frequency of the reception OFDM symbol according to the frequency hopping sequence to perform frequency de-hopping in the digital domain. The demodulating unit 210 generates the reception bit stream by demodulating the reception OFDM symbol provided from the second converting unit 220. The demodulating unit 210 may provide the reception bit stream to an upper layer unit, such as a MAC.

The RF unit 500 provides the antenna 600 with the transmission OFDM symbol by up-converting the frequency of the transmission OFDM symbol, and down-converts the reception OFDM symbol provided from the antenna 600. In the example of FIG. 12, the RF unit 500 includes a local oscillator 510, a transmission mixer 520, a power amplifier 530, a switch 540, a filter 550, a low noise amplifier 560, and a reception mixer 570.

The local oscillator 510 generates an oscillation signal. Since the baseband processor 400 performs the frequency hopping and the frequency de-hopping in the digital domain, the local oscillator 510 may generate the oscillation signal having a fixed oscillation frequency regardless of the frequency hopping sequence. Accordingly, implementation of the local oscillator 510 and the RF unit 500 of a relatively small size may be facilitated.

The transmission mixer 520 up-converts the frequency of the transmission OFDM symbol. The transmission mixer 520 may perform the frequency up-conversion by mixing the transmission OFDM symbol with the oscillation signal provided from the local oscillator 510. In some embodiments, the transmission mixer 520 may perform the frequency up-conversion of an in-phase transmission OFDM symbol and a quadrature-phase transmission OFDM symbol using the oscillation signal and a signal that is shifted by a phase of 90 degrees with respect to the oscillation signal. The power amplifier 530 receives the up-converted transmission OFDM symbol from the transmission mixer 520, and amplifies the transmission OFDM symbol such that the antenna 600 may transmit the transmission OFDM symbol of appropriate amplitude.

The filter 550 may include a band-pass filter that reduces an out-of-band signal or noise of the reception OFDM symbol received through the antenna 600. The filter 550 may reduce an out-of-band spurious component of the transmission OFDM symbol by filtering the transmission OFDM symbol provided through the switch 540 from the power amplifier 530. The switch 540 couples the filter 550 to a reception path in a reception mode to provide the low noise amplifier 560 with the reception OFDM symbol received through the antenna 600. In addition, the switch 540 couples the filter 550 to a transmission path in a transmission mode to provide the transmission OFDM symbol from the power amplifier 530 to the filter and to transmit the filtered transmission OFDM symbol through the antenna 600.

The low noise amplifier 560 amplifies the reception OFDM symbol that is filtered by the filter 550. The low noise amplifier 560 may have low noise figure to reduce the effect of the noise. The reception mixer 570 down-converts the frequency of the reception OFDM symbol that is amplified by the low noise amplifier 560. The reception mixer 570 may perform the frequency down-conversion by mixing the reception OFDM symbol with the oscillation signal provided from the local oscillator 510. In some embodiments, the reception mixer 570 may perform the frequency up-conversion of an in-phase reception OFDM symbol and a quadrature-phase reception OFDM symbol using the oscillation signal and a signal that is shifted by a phase of 90 degrees with respect to the oscillation signal.

The RF unit 500 may have various configurations according to communication standards. For example, the RF unit 500 may be a direct conversion transceiver that directly coverts a wireless signal received through the antenna 600 into a baseband signal, an intermediate frequency (IF) transceiver that converts the wireless signal into an IF signal and then converts the IF signal into the baseband signal, or a low-IF transceiver. In some embodiments, the RF unit 500 may further include a variable gain amplifier that amplifies the transmission OFDM symbol or the reception OFDM symbol, and a low-pass filter that extracts an in-band component.

As described above, in the wireless device 300 according to some example embodiments, since the baseband processor 400 performs the frequency hopping and the frequency de-hopping in the digital domain, implementation of an analog RF unit 500 of relatively small size may be facilitated.

Figure 13:
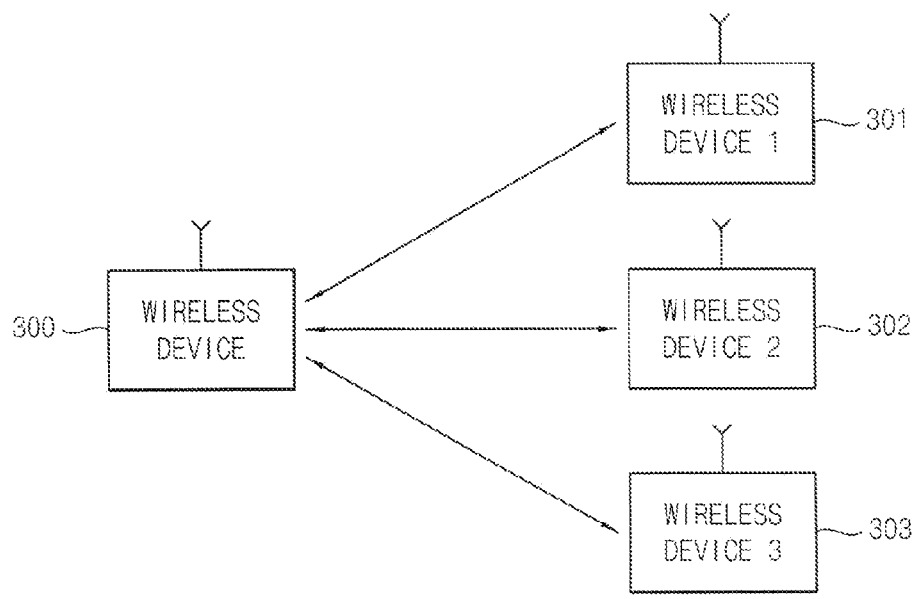
FIG. 13 is a block diagram illustrating a wireless network including a wireless device according to example embodiments.

FIG. 13 is a block diagram illustrating a wireless network including a wireless device according to example embodiments.

Referring to FIG. 13, a wireless device 300 simultaneously communicates with a plurality of wireless devices 301, 302 and 303. The wireless device 300 may include a digital-to-analog converter and an analog-to-digital converter having a sample rate of about 1,584 MHz or more, and may simultaneously use a plurality of frequency bands to simultaneously communicate with the plurality of wireless devices 301, 302 and 303. The wireless device 300 and the plurality of wireless devices 301, 302 and 303 may belong to the same piconet, or may belong to different piconets.

Figure 14:
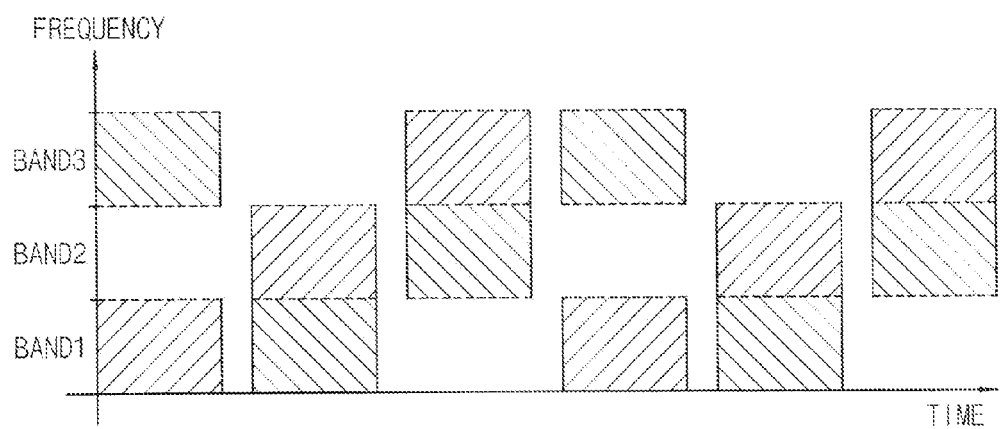
FIG. 14 is a diagram for describing a method of communicating with a plurality of wireless devices using a plurality of frequency hopping sequences according to example embodiments.

FIG. 14 is a diagram for describing a method of communicating with a plurality of wireless devices using a plurality of frequency hopping sequences according to example embodiments.

Referring to FIGS. 13 and 14, a wireless device 300 of this example communicates with a plurality of wireless devices 301, 302 and 303 using a plurality of frequency hopping sequences. For example, the wireless device 300 may communicate with a first wireless device 301 using a first frequency hopping sequence of a first frequency band, a second frequency band, a third frequency band, the first frequency band, the second frequency band, and the third frequency band, and may communicate with a second wireless device 302 using a second frequency hopping sequence of the third frequency band, the first frequency band, the second frequency band, the third frequency band, the first frequency band, and the second frequency band. Accordingly, the wireless device 300 may communicate with the first and the second wireless devices 301 and 302 using the first and the second frequency hopping sequences that do not overlap with each other.

Figure 15:
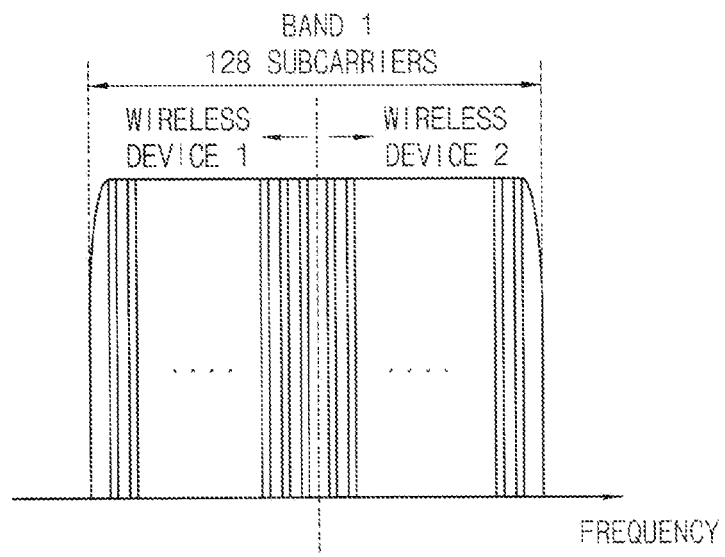
FIG. 15 is a diagram for describing a method of communicating with a plurality of wireless devices by dividing a plurality of subcarriers according to example embodiments.

FIG. 15 is a diagram for describing a method of communicating with a plurality of wireless devices by dividing a plurality of subcarriers according to example embodiments.

Referring collectively to FIGS. 13 and 15, a wireless device 300 of this example communicates with a plurality of wireless devices by dividing a plurality of subcarriers such that each subcarrier is exclusively used to communicate with a single wireless device and is not shared by the plurality of wireless devices. For example, the wireless device 300 may communicate with a first wireless device 301 using a first through a sixty-fourth subcarriers in a first frequency band, and may communicate with a second wireless device 302 using a sixty-fifth through one-hundred-and-twenty-eighth subcarriers in the first frequency band. The first through the one-hundred-and-twenty-eighth subcarriers may be divided in various ways. For example, the subcarriers may be divided such that odd numbered subcarriers may be used to communicate with the first wireless device 301 and even numbered subcarriers may be used to communicate with the second wireless device 302. Accordingly, the wireless device 300 may simultaneously communicate with the first and the second wireless devices 301 and 302 by dividing the subcarriers of one frequency band such that the subcarriers may be assigned to the first and the second wireless devices 301 and 302 without overlap. In some embodiments, the wireless device 300 may communicate with the first and the second wireless devices 301 and 302 using the same frequency hopping sequence. In other embodiments, the wireless device 300 may communicate with the first and the second wireless devices 301 and 302 using different frequency hopping sequences, and the subcarriers may be divided only when the wireless device 300 may communicate with the first and the second wireless devices 301 and 302 in the same frequency band.

Figure 16:
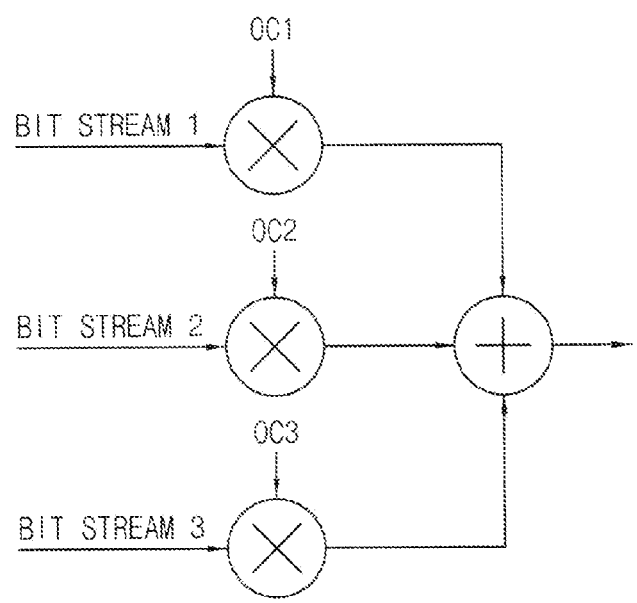
FIG. 16 is a diagram for describing a method of communicating with a plurality of wireless devices using a plurality of orthogonal codes according to example embodiments.

FIG. 16 is a diagram for describing a method of communicating with a plurality of wireless devices using a plurality of orthogonal codes according to example embodiments.

Referring collectively to FIGS. 13 and 16, the wireless device 300 of this example simultaneously communicates with a plurality of wireless devices using a plurality of orthogonal codes. For example, the wireless device 300 may transmit OFDM symbols to a first wireless device 301, a second wireless device 302 and a third wireless device 303 by mixing a first bit stream with a first orthogonal code OC1, a second bit stream with a second orthogonal code OC2, and a third bit stream with a third orthogonal code OC3, respectively. In this example, the first wireless device 301 recovers the first bit stream using the first orthogonal code OC1, the second wireless device 302 recovers the second bit stream using the second orthogonal code OC2, and the third wireless device 303 recovers the third bit stream using the third orthogonal code OC3. The first orthogonal code OC1, the second orthogonal code OC2, and the third orthogonal code OC3 may be orthogonal to one another. In some embodiments, the wireless device 300 mixes the bit streams with the orthogonal codes OC1, OC2 and OC3 using a scrambler 111 included in a modulating unit 110 of FIG. 6. As described above, the wireless device 300 may communicate with the plurality of wireless devices using the plurality of orthogonal codes.

Figure 17:
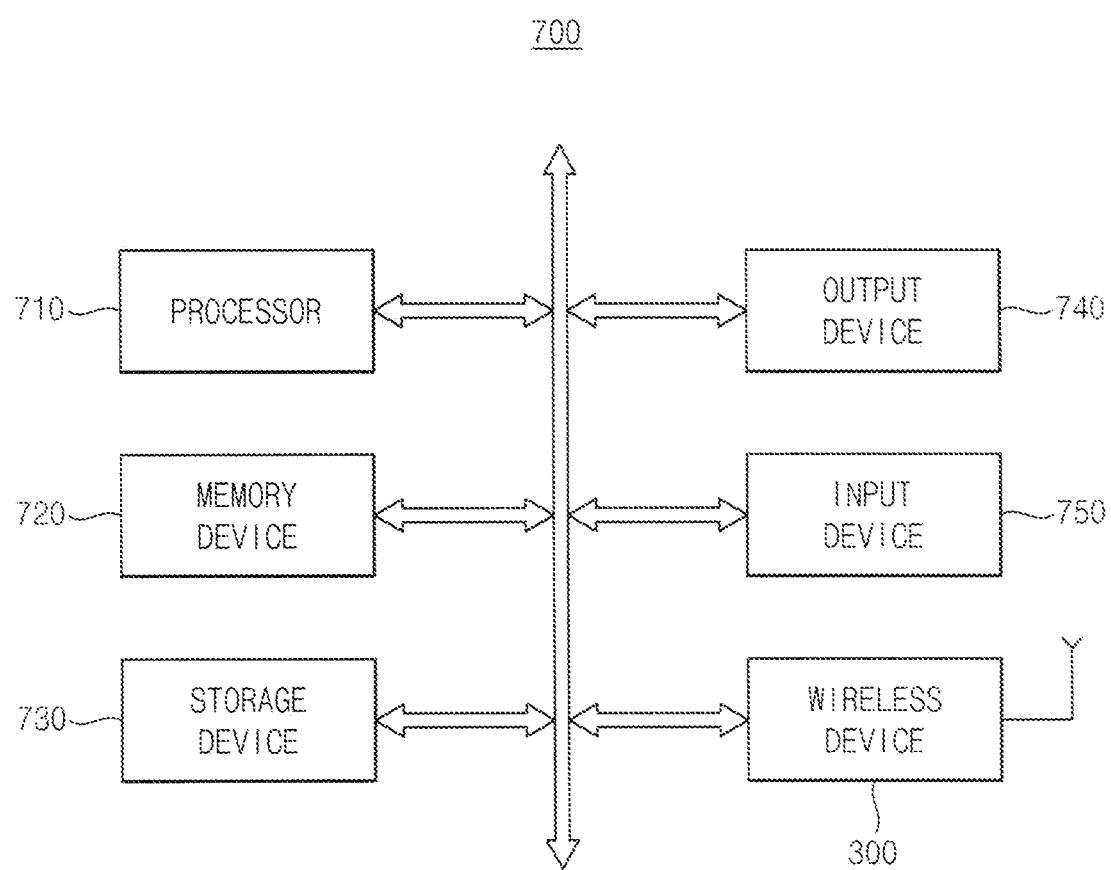
FIG. 17 is a block diagram illustrating a computing system including a wireless device according to example embodiments.

FIG. 17 is a block diagram illustrating a computing system including a wireless device according to example embodiments.

Referring to FIG. 17, a computing system 700 includes a processor 710, a memory device 720 and a wireless device 300. In some embodiments, the computing system 700 may further include a storage device 730, an output device 740 and an input device 750.

The processor 710 performs various computing functions, such as executing specific software for performing specific calculations or tasks. For example, the processor 710 may be a microprocessor or a central process unit (CPU). In the example of FIG. 17, the processor 710 is coupled to the memory device 720 via an address bus, a control bus and/or a data bus. For example, the memory device 720 may be a dynamic random access memory (DRAM), a static random access memory (SRAM), or a non-volatile memory, such as an erasable programmable read-only memory (EPROM), an electrically erasable programmable read-only memory (EEPROM), or the like. The processor 710 may also be coupled to an expansion bus, such as a peripheral-component-interconnect (PCI) bus. In the example of FIG. 17, the processor 710 controls the input device 750 (e.g., a keyboard or a mouse), the output device 740 (e.g., a printer or a display device) and the storage device 730 (e.g., a hard disk drive or a compact disk read-only memory (CD-ROM)).

As described above, a baseband processor and a wireless device according to example embodiments executes frequency hopping and/or frequency de-hopping in a digital domain. Accordingly, implementation of an analog RF unit of a relatively small size is facilitated. Further, a baseband processor and a wireless device according to example embodiments allow for a reduction in power consumption and for transmission of signals of uniform power for a plurality of frequency bands.

The baseband processor and the wireless device according to some example embodiments may be applicable to any type of computing system, such as a computer system, a notebook computer, a mobile phone, a smart phone, a digital camera, a handheld computer, a music player, a gaming machine, a personal digital assistant (PDA), a portable multimedia player (PMP), a universal serial bus (USB) device, and so on.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A baseband processor comprising:
a modulating unit configured to generate an orthogonal frequency division multiplexing (OFDM) symbol by modulating a bit stream; and
a converting unit configured to convert the OFDM symbol from a frequency domain into a time domain, and to adjust a frequency of the OFDM symbol according to a frequency hopping sequence to perform frequency hopping in a digital domain and in the time domain,
wherein the converting unit comprises:
a time-frequency code unit configured to generate a band selection signal based on a time-frequency code corresponding to the frequency hopping sequence;
an IFFT unit configured to convert the OFDM symbol from the frequency domain into the time domain; and
a digital mixer configured to perform the frequency hopping of the converted OFDM symbol in the time domain in response to the band selection signal,
wherein the baseband processor further comprises a digital-to-analog converter configured to convert the OFDM symbol provided from the converting unit from the digital domain into an analog domain, and
wherein the digital-to-analog converter has a sampling rate corresponding to at least two frequency bands.

2. The baseband processor of claim 1, wherein the digital mixer is further configured to adjust the frequency of the converted OFDM symbol by multiplying the OFDM symbol and a rotation phase corresponding to a frequency band indicated by the band selection signal.

3. The baseband processor of claim 1, wherein the IFFT unit is a 128-point IFFT unit.

4. The baseband processor of claim 1, wherein the digital-to-analog converter has the sampling rate of about 1,584 MHz.

5. A baseband processor comprising:
a converting unit configured to receive an orthogonal frequency division multiplexing (OFDM) symbol, to convert the OFDM symbol from a time domain into a frequency domain, and to adjust a frequency of the OFDM symbol according to a frequency hopping sequence to perform frequency de-hopping in a digital domain and in the time domain; and
a demodulating unit configured to generate a bit stream by demodulating the converted OFDM symbol provided from the converting unit,
wherein the converting unit comprises:
a time-frequency code unit configured to generate a band selection signal based on a time-frequency code corresponding to the frequency hopping sequence;
a digital mixer configured to perform the frequency de-hopping in response to the band selection signal to obtain the OFDM symbol in the time domain; and
a fast Fourier transform unit configured to convert the OFDM symbol in the time domain into the OFDM symbol in the frequency domain,
wherein the baseband processor further comprises an analog-to-digital converter configured to provide the OFDM symbol to the converting unit by converting the OFDM symbol from an analog domain into the digital domain, and
wherein the analog-to-digital converter has a sampling rate corresponding to at least two frequency bands.

6. The baseband processor of claim 5, wherein the digital mixer is further configured to adjust the frequency of the OFDM symbol by multiplying the OFDM symbol and a rotation phase corresponding to a frequency band indicated by the band selection signal.

* * * * *